United States Patent [19]

Mori

[11] Patent Number: 5,327,078
[45] Date of Patent: Jul. 5, 1994

[54] POSITION DETECTING APPARSTUS HAVING A MEAN VALUE CALCULATING CIRCUIT INCLUDING A LOW PASS FILTER

[75] Inventor: Akira Mori, Cigasaki, Japan

[73] Assignee: Kabushiki Kaisha Komatsu Speisakusho, Tokyo, Japan

[21] Appl. No.: 915,850

[22] PCT Filed: Jan. 29, 1991

[86] PCT No.: PCT/JP91/00096
§ 371 Date: Jul. 29, 1992
§ 102(e) Date: Jul. 29, 1992

[87] PCT Pub. No.: WO91/11685
PCT Pub. Date: Aug. 8, 1991

[30] Foreign Application Priority Data

Jan. 31, 1990 [JP] Japan .................... 2-21261

[51] Int. Cl.$^5$ .................... G01B 7/34; G01D 5/245
[52] U.S. Cl. .................... 324/207.24; 324/207.12; 324/207.19; 307/358; 307/520; 307/551; 328/149; 328/167
[58] Field of Search ............ 324/207.19, 207.12, 324/119, 207.24; 364/811; 307/358, 309, 520, 494, 228, 263, 551; 328/146, 147, 149, 185, 167

[56] References Cited

U.S. PATENT DOCUMENTS

| 4,629,983 | 12/1986 | Boomgaard et al. | 324/208 |
| 4,646,012 | 2/1987 | Feilchenfeld et al. | 324/208 |
| 4,749,951 | 6/1988 | Tanaka | 328/167 |
| 4,992,731 | 2/1991 | Lorenzen | 324/174 |
| 5,144,321 | 9/1992 | Tenenbaum et al. | 324/164 |

FOREIGN PATENT DOCUMENTS

| 54-43764 | 4/1979 | Japan . |
| 61-1107 | 1/1986 | Japan . |
| 61-52016 | 3/1986 | Japan . |
| 63-134901 | 6/1988 | Japan . |
| 63-262768 | 10/1988 | Japan . |
| 3-118418 | 8/1991 | Japan . |
| 3-185301 | 8/1991 | Japan . |

*Primary Examiner*—Kenneth A. Wieder
*Assistant Examiner*—Jay M. Patidar
*Attorney, Agent, or Firm*—Richards, Medlock & Andrews

[57] ABSTRACT

A position detecting apparatus for magnetically detecting the position of, for example, a cylinder rod of a construction or industrial machine, a piston of an automotive engine or a scaler of a magnetic scale, improved to reduce a delay of response of processing through a low-pass active filter. To this end, the apparatus has a mean value calculating circuit (22) which calculates the mean value of an output voltage from a detecting circuit (10) and delivers the mean value to a comparator circuit (32) as a reference voltage. In addition, diodes ($D_1$, $D_2$) for charging the capacitors ($C_1$, $C_2$) of the low-pass active filters constituting the mean value calculating circuit can be connected in parallel with resistors ($R_1$, $R_2$) of the filters.

18 Claims, 6 Drawing Sheets

| LOW-PASS ACTIVE FILTER | INPUT WAVE | OUTPUT OF OPERATING AMPLIFIER 42 | OUTPUT OF OPERATING AMPLIFIER 52 |
|---|---|---|---|
| (A) |  |  |  |
| (B) |  |  |  |

POSITION DETECTING APPARSTUS HAVING A MEAN VALUE CALCULATING CIRCUIT INCLUDING A LOW PASS FILTER

TECHNICAL FIELD

The present invention relates to a position detecting apparatus which magnetically detects the position of, for example, a cylinder rod in a construction or other industrial machine, a piston of an automotive engine, a scaler of a magnetic scale, and so forth.

BACKGROUND ART

Hitherto, for the purpose of detecting the position of a cylinder rod of a construction or industrial machine, a position detecting apparatus has been often used in which a variation in the magnetic characteristics is created at a predetermined spacing along the cylinder rod or a detecting rod connected thereto, by attaching magnets to the rod or varying the magnetic permeability at the predetermined spacing, whereby the displacement or position of the rod is detected on the basis of the change in the magnetic characteristics. The change in the magnetic characteristics can be detected by various detecting means such as, for example, a detecting means using a Maxwell bridge circuit. The Maxwell bridge circuit has four sides, one of which is formed by a coil having a reference inductance $L_1$, and a coil having an unknown value of inductance $L_3$ is inserted in another side of the bridge. In operation, an adjustment is conducted to nullify the output voltage between the output terminals, thereby determining the inductance $L_3$.

More specifically, a known position detecting apparatus incorporating a Maxwell bridge circuit has a detecting rod made of a magnetically permeable metal. The detecting rod has a plurality of magnetic permeability changing portions which are formed by locally increasing or decreasing magnetic permeability at a predetermined pitch along the rod. The detecting rod is received in the coil having the unknown inductance $L_3$. When the detecting rod is axially moved to cause the magnetic permeability changing portion to pass through the coil, the self-inductance $L_3$ of the coil is changed to cause a difference between the voltage across this coil and the voltage across the coil having the inductance $L_1$. Consequently, an A.C. voltage produced by this phase difference is obtained from the output terminals, and the amount of displacement, i.e., the position, of the detecting rod is determined on the basis of the zero-cross point of the A.C. voltage.

The voltage between the output terminals of the Maxwell bridge circuit should be zero when there is no displacement of the detecting rod. Actually, however, a voltage appears between the output terminals even when there is no displacement of the detecting rod, due to variations or fluctuations of various factors such as the sensor sensitivity, the state of mounting of the detecting rod, the magnetic permeability of the detecting rod, and the characteristics of the circuit elements, as well as the temperature at which the detecting apparatus operates, with the result that the zero-cross point is deviated. Thus, the output voltage obtained from the Maxwell bridge circuit in response to an axial movement of the detecting rod is the sum of the A.C. voltage generated as a result of passage of the magnetic permeability changing portion through the coil and a D.C. voltage (offset voltage) which is attributable to the offset of the zero-cross point caused by fluctuations in the factors such as the sensor sensitivity and the characteristics of the circuit components. Therefore, the determination of the position or displacement of the detecting rod through the detection of the zero-cross point of the A.C. output voltage from a Maxwell bridge circuit essentially requires that the offset voltage component be removed from the output voltage of the Maxwell bridge circuit.

There are two methods for removing the offset voltage: a method called A.C. coupling method which utilizes a capacitor, and a method called voltage adjusting method which uses a trimmer resistor. The A.C. coupling method, which relies upon charging and discharging of a capacitor, suffers from various disadvantages such as the generation of a delay of a phase or delay of zero-cross of the A.C. voltage due to inferior follow-up characteristics. Furthermore, it is impossible to pickup an A.C. component from the output of the Maxwell bridge circuit, when the frequency of the A.C. component is as low as several Hz or less. On the other hand, the voltage adjusting method which employs a trimmer resistor essentially requires a complicated voltage adjustment, particularly when the frequency of the output voltage of the Maxwell bridge circuit is changed or when the center of the amplitude of the output is varied due to a variation in the offset voltage. This problem is serious, particularly when a cylinder rod is used directly as the detecting rod, since in such a case the offset voltage is varied as a result of a change in the temperature of the detecting rod, with the result that the adjustment of the voltage is further complicated.

In view of these drawbacks of the known art, the present inventor has proposed a method in which, as shown in FIG. 6, a mean value of the output voltage of the detecting circuit including a Maxwell bridge circuit is used as a reference voltage of a comparator circuit.

Referring to FIG. 6, the detecting circuit 10 is composed of a Maxwell bridge circuit 12, a phase detector 14 and a differential amplifier 16, and is connected to the output of an oscillator 18 which serves as an A.C. power supply. The oscillator 18 produces a high-frequency voltage of, for example, 60 KHz, and applies this voltage to the Maxwell bridge circuit 12 and also to the phase detector 14. A voltage appearing between the output terminals a and b of the Maxwell bridge circuit 12 is amplified by a differential amplifier 16, the output of which is delivered to the phase detector 14.

The phase detector 14 determines the phase difference between the output voltage of the oscillator 18 and the output voltage of the differential amplifier 16 and produces, as its output signal, a voltage corresponding to the phase difference. The output voltage of the phase detector 14 is delivered to a noise filter 20 for removing the noise of the output voltage and also to a mean value calculating circuit 22.

The mean value calculating circuit 22 is composed of a low-pass active filter of voltage controlled voltage source type (referred to as VCVS, hereinafter) having Butterworth characteristic, and is composed of an RC passive circuit 24 and an operational amplifier 26. The output of the operational amplifier 26 is delivered to a voltage holding circuit 28. The voltage holding circuit 28 receives a one-shot pulse from a voltage holding timing generating circuit 30 which produces voltage holding timing on the basis of the output from the noise filter 20. Upon receipt of this one-shot pulse, the voltage holding circuit 28 stores the mean voltage which is outputted from the mean value calculating circuit 22 and holds this value until the next one-shot pulse is received. The voltage holding circuit 28 also delivers this mean voltage as a reference voltage to a comparator circuit 32 which also receives the output from the noise filter 20.

Using the mean value of the output from the detecting circuit 10 as the reference voltage of the comparator circuit 32, it is possible to automatically adjust the offset voltage appearing between the output terminals a and b of the Maxwell bridge 12.

The low-pass active filter of VCVS type which forms the mean value calculating circuit 22 has a time constant $R_1R_2C_1C_2$ and the frequency $f_0$ is expressed by:

$$f_0 = 1/2\pi \sqrt{R_1R_2C_1C_2}$$

This frequency $f_0$ is the center frequency of the filtering. The frequency of the output voltage of the detecting circuit 10 is varied by the velocity of the movement of the detecting rod which is not shown and which is received in the coil $L_3$ of the Maxwell bridge circuit 12. Therefore, when the mean value of the output voltage of the detecting circuit 10 is calculated by the mean value calculating circuit 22, it is necessary to change the center frequency $f_0$ of the low-pass active filter in accordance with the velocity of the movement of the detecting rod. It is quite difficult to vary the center frequency $f_0$ in accordance with the velocity of movement of the detecting rod. It is therefore desirable that the low-pass active filter be capable of smoothing all the frequencies which are outputted from the detecting circuit 10 in accordance with any change in the velocity of the movement of the detecting rod.

On the other hand, the velocity of the movement of the detecting rod is low when the movement is started, as in the case of a cylinder rod. The use of the low-pass active filter is therefore necessary for determining the mean value of the output voltage of the detecting circuit 10. Actually, however, the velocity of the detecting rod varies over a wide range and so does the frequency of the output voltage of the detecting circuit 10. Therefore, when the mean value of the output of the detecting circuit in the high-speed range is calculated with the aid of the low-pass filter, a delay of smoothing calculation (delay of response) is caused due to time constant, although the calculation for determining the mean value is carried out.

FIG. 7 illustrates an example of such a delay in the response. It will be seen that 300 m sec is required until the mean value calculating circuit 22 outputs the mean value of the output voltage of the detecting circuit 10 after the moment at which the detecting rod which has been kept stationary starts to move.

The present invention is aimed at overcoming the above-described problems of the prior art. An object of the present invention is to provide a position detecting apparatus which is capable of reducing delay of response of the low-pass active filter.

SUMMARY OF THE INVENTION

To achieve the above-described object, there is provided a position detecting apparatus which comprises a mean value calculating circuit which calculates the mean value of the output voltages from a detecting circuit and delivers the mean value as a reference voltage to a comparator circuit, wherein a diode for charging a capacitor of a low-pass active filter forming the mean value calculating circuit is connected in parallel with the resistor of the filter.

More specifically, the mean value calculating circuit includes a plurality of stages of low-pass filters which have different center frequencies and which are connected in series, such that the center frequency of the stage closer to the input side is higher than that of the stage closer to the output side.

Each of the plurality of stages of the low-pass active filters has a capacitor which is charged by a diode connected in parallel to the resistor of the filter.

According to this arrangement, the capacitor of the low-pass active filter is charged through a diode, so that the time required for charging the capacitor is shortened. Consequently, the calculating time constant (smoothing time constant) of the mean value calculating circuit is reduced to reduce the delay of the response correspondingly. Furthermore, since the diode passes the electrical current only in the direction for enabling charging of the capacitor, the capacitor can have an ordinary time constant in the discharging direction, thus preventing impairment of the smoothing characteristic of the mean value calculating circuit.

The output voltage from the detecting circuit passes through successive stages of low-pass filters starting from the filter having the highest center frequency. Therefore, the attenuation in one stage of the filters is superposed on the attenuation of the preceding stage, so that the calculation time constant is shortened to reduce the delay of calculation.

The characteristics of the apparatus can be further improved by providing a diode for charging the capacitor of each filter.

THE BEST MODE FOR CARRYING OUT THE INVENTION

Figure 6:
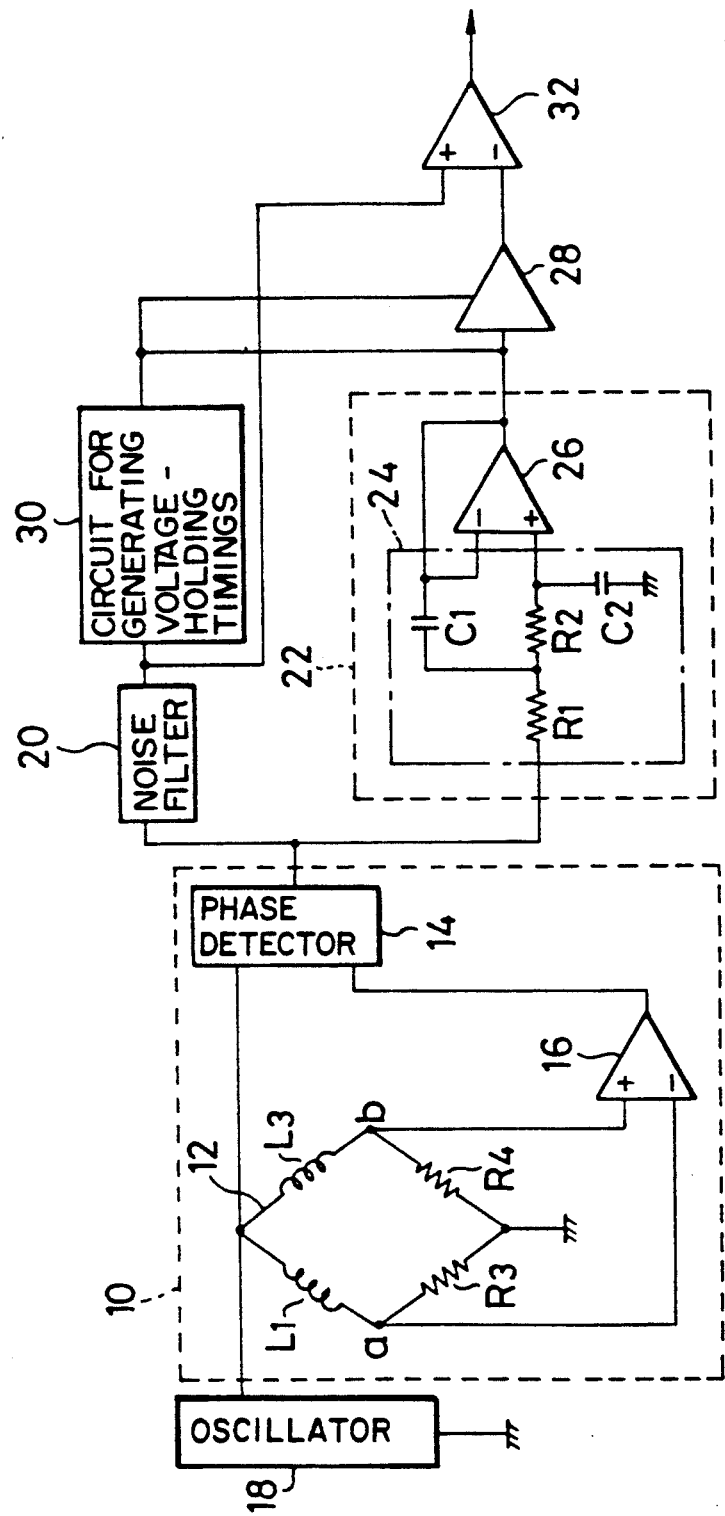
FIG. 6 is an illustration of a position detecting apparatus, proposed by the present inventor, having a mean value calculating circuit for calculating the mean value of the detecting circuit.

Preferred embodiments of the position detecting apparatus of the present invention will be described in detail with reference to the accompanying drawings. In the following description, components or parts which are common to FIG. 6 described hereinbefore are denoted by the same references as used for FIG. 6, and a detailed description of such components or parts is omitted.

Figure 1:
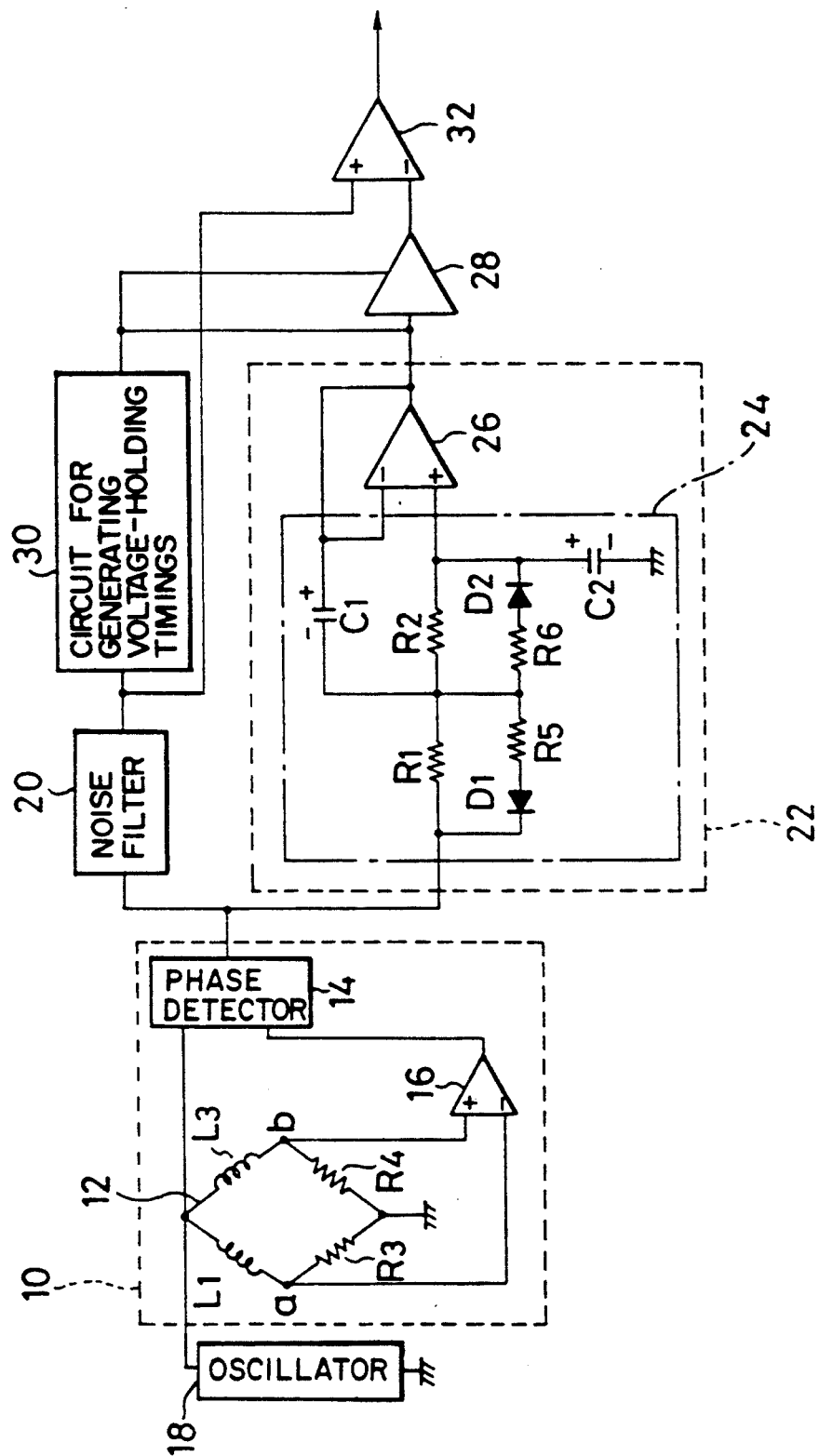
FIG. 1 is an illustration of a first embodiment of the position detecting apparatus in accordance with the present invention.

FIG. 1 is an illustration of the position detecting apparatus in accordance with the first embodiment of the present invention. The mean value calculating circuit 22 is composed of an RC passive circuit 24 and an operational amplifier 26. The RC passive circuit 24 includes a series connection of resistors $R_1$ and $R_2$, a series connection of a diode $D_1$ and a resistor $R_5$ connected in parallel with the resistor $R_1$ and a series connection of a diode $D_2$ and a resistor $R_6$ connected in parallel with the resistor $R_2$. The diode $D_1$ connected in parallel with the resistor $R_1$ is intended for charging a capacitor $C_1$ which has one end connected to a point between the resistors $R_1$ and $R_2$. The cathode of the diode $D_1$ is connected to the output of the phase detector 14 together with the resistor $R_1$. The anode of the diode $D_1$ is connected to a point between the resistors $R_1$ and $R_2$ through the resistor $R_5$ having a small resistance, e.g., 1 Ω.

The diode $D_2$ is intended for charging a capacitor $C_2$ which is connected to the non-inversion input terminal of the operation amplifier 26. The cathode of this diode $D_2$ is connected to the non-inversion input terminal of the operational amplifier 26 together with the resistor $R_2$ and also to a capacitor $C_2$ which is grounded at its other end. The anode of the diode $D_2$ is connected to a point between the resistors $R_1$ and $R_2$ through the resistor $R_6$ having a small resistance value.

One end of the capacitor $C_1$ is connected to a point between the resistors $R_1$ and $R_2$, and the other end of capacitor $C_1$ is connected to the inversion input terminal of the operational amplifier 26. The operational amplifier 26 is of the voltage follower type in which the whole output voltage is negatively fed back.

In the first embodiment as described above, the voltage outputted from the phase detector 14, when the voltage is positive, charges the capacitor $C_2$ as illustrated, through the resistor $R_1$, resistor $R_6$ and the diode $D_2$. Consequently, the non-inversion input terminal of the operational amplifier 26 receives a voltage corresponding to the terminal voltage of the capacitor $C_2$, so that the capacitor $C_1$ is charged by the output voltage from the operational amplifier 26 as illustrated.

On the other hand, when the voltage outputted from the phase detector 14 is negative, the capacitor $C_1$ is charged to a polarity opposite to that illustrated, via the diode $D_1$ and the resistor $R_5$, while the capacitor $C_2$ discharges through the resistor $R_2$.

In this embodiment, it is thus possible to shorten the time required for charging the capacitors $C_1$ and $C_2$, by the provision of the diodes $D_1$ and $D_2$ for charging the capacitors $C_1$ and $C_2$, thereby shortening the time required for the smoothing calculation performed by the mean value calculating circuit. Consequently, the mean value calculating circuit 22 can operate with a small calculating time constant even in the range where the velocity of the movement of the detecting rod is high, despite the center frequency of the RC passive circuit 24 being set in a region where the velocity of the movement of the detecting rod is low, thus reducing the delay of response. Furthermore, since the diodes $D_1$ and $D_2$ pass currents only in the directions for charging the capacitors $C_1$ and $C_2$, the capacitors $C_1$ and $C_2$ maintain ordinary discharge time constants, so that the smoothing characteristic is not impaired.

Figure 2:
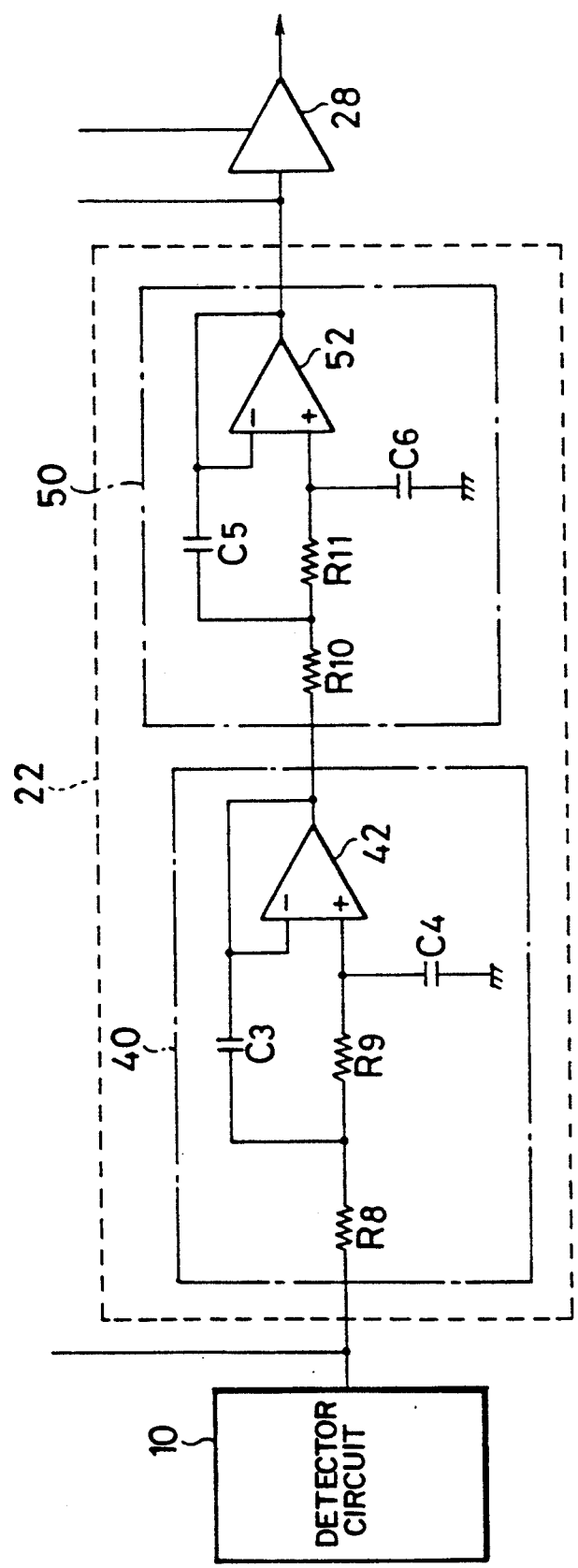
FIG. 2 is a circuit diagram of a mean value calculating circuit used in a second embodiment of the present invention.

FIG. 2 is a circuit diagram of a mean value calculating circuit used in a second embodiment of the present invention. The mean value calculating circuit 22 has two low pass active filters 40 and 50 which are connected in series to each other. The filters 40 and 50 have similar constructions.

The RC passive circuit of the low-pass active filter 40 is composed of a pair of resistors $R_8$, $R_9$ and a pair of capacitors $C_3$ and $C_4$. More specifically, resistors $R_8$ and $R_9$ are connected in series to each other, and one end of the capacitor $C_3$ is connected to a point between the resistors $R_8$ and $R_9$. The capacitor $C_4$ is connected to the other end of the resistor $R_9$. One end of the resistor $R_8$ is connected to the detecting circuit 10, while one end of the resistor $R_9$ is connected to the non-inversion (+) input terminal of the operational amplifier 42 together with the grounded capacitor $C_4$. The other end of the capacitor $C_3$ is connected to the inversion input terminal (−) of the operational amplifier 42. As in the case of the first embodiment, the operational amplifier 42 is of voltage follower type.

The other low-pass active filter 50 has an RC passive circuit which is constituted by resistors $R_{10}$, $R_{11}$ and capacitors $C_5$, $C_6$ which are arranged in the same manner as the resistors and capacitors of the first-mentioned low-pass active filter 40. One end of the resistor $R_{10}$ is connected to the output terminal of the operational amplifier 42 which also serves as the output terminal of the filter 40.

These low-pass active filters 40 and 50, however, have different levels of center frequency $f_0$. More specifically, the resistance and capacitance values of the resistors $R_8$, $R_9$ and capacitors $C_3$, $C_4$ of the preceding stage of the low-pass active filter 40 connected to the detecting circuit 10 are smaller than those of the resistors $R_{10}$, $R_{11}$ and capacitors $C_5$, $C_6$ of the next stage of the low-pass active filter 50. Consequently, the low-pass active filter 40 has a smaller calculating time constant and a higher center frequency $f_0$ than the low-pass active filter 50.

Resistance values and capacitance values of the resistors and capacitors of these low-pass active filters are exemplarily shown below.

In the filter 40 of the preceding stage:

$R_8 = R_9 = 100$ KΩ, $C_3 = C_4 = 1030$ pF

In the filter 50 of the next stage:

$R_{10} = R_{11} = 510$ KΩ, $C_5 = C_6 = 4730$ pF

Figure 3:
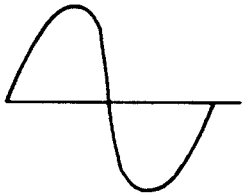
FIG. 3 is an illustration of the operation of the mean value calculating circuit in the second embodiment.
Figure 3:
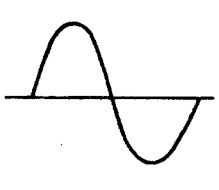
Figure 3:
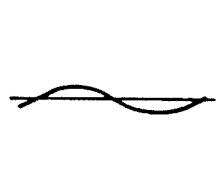
Figure 3:
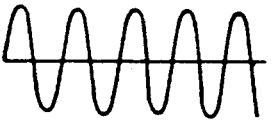
Figure 3:
Figure 3:

In the second embodiment having the described construction, when the frequency of the detecting circuit 10 is low as shown in (A) of FIG. 3, the mean value calculating circuit 22 operates such that the calculation of mean value of the voltages is conducted mainly by the filter 50 of the output-side stage having the lower center frequency $f_0$. In such a case, any error attributable to the delay of response is negligibly small even though the speed of response of the mean value calculating circuit 22 is low, because the variation or change of voltage which is inputted from the detecting circuit takes place slowly.

When the frequency of the output voltage of the detecting circuit 10 is high as shown in (B) of FIG. 3, the calculation of the mean value of the voltages is conducted mainly by the input-side filter 40 which has a higher center frequency $f_0$ and a smaller calculating time constant. It is therefore possible to reduce a delay of response attributable to an increase in the frequency of the voltage inputted to the mean value calculating circuit 22. In this case, the filter 50 of the output-side stage does not make any substantial contribution to the smoothing of the voltage, so that it does not substantially affect the smoothing operation although its response speed is low.

In the second embodiment as described, the mean value calculating circuit 22 includes two filters 40, 50 which are connected in series. This, however, is only illustrative and the circuit 22 may employ three or more filters connected in series, provided that the center frequency $f_0$ of the preceding stage is higher than that of the next stage.

Figure 4:
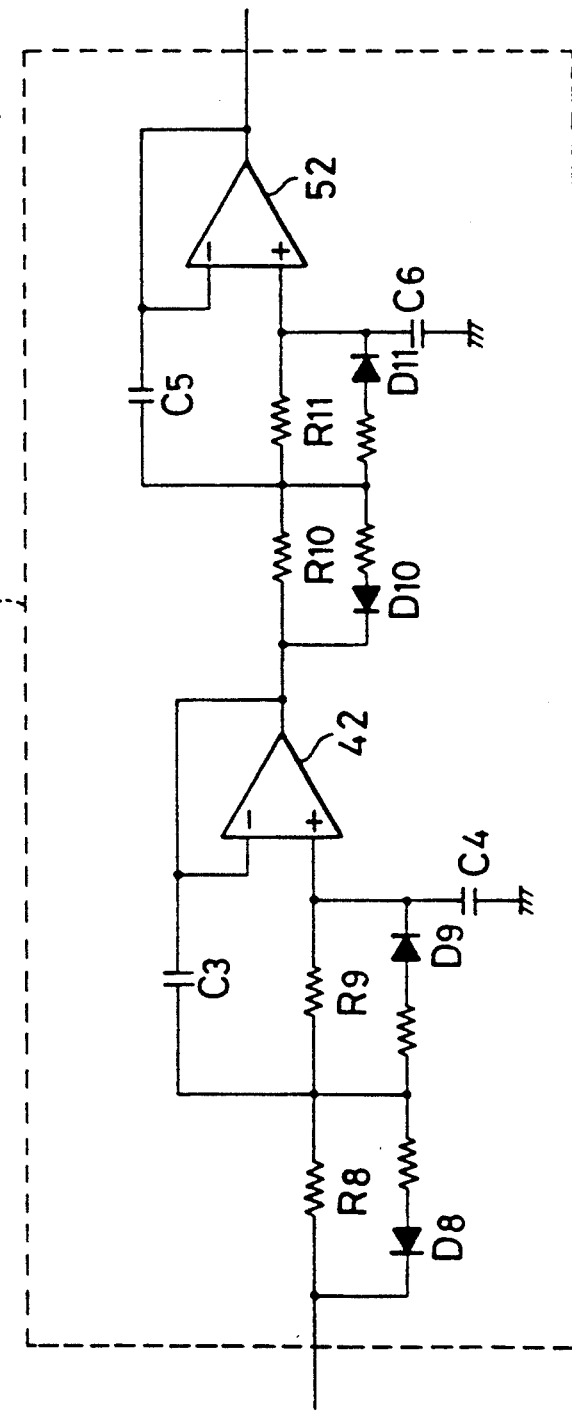
FIG. 4 is a circuit diagram of a mean value calculating circuit used in a third embodiment of the present invention.

FIG. 4 is a circuit diagram of a mean value calculating circuit of the third embodiment. The third embodiment is characterized in that, as in the case of the embodiment shown in FIG. 1, diodes $D_8$, $D_9$, $D_{10}$ and $D_{11}$ are connected in parallel with the resistors $R_8$, $R_9$, $R_{10}$ and $R_{11}$, respectively, for the purpose of charging the capacitors $C_3$, $C_4$, $C_5$ and $C_6$, respectively, of the mean value calculating circuit 22.

Figure 5:
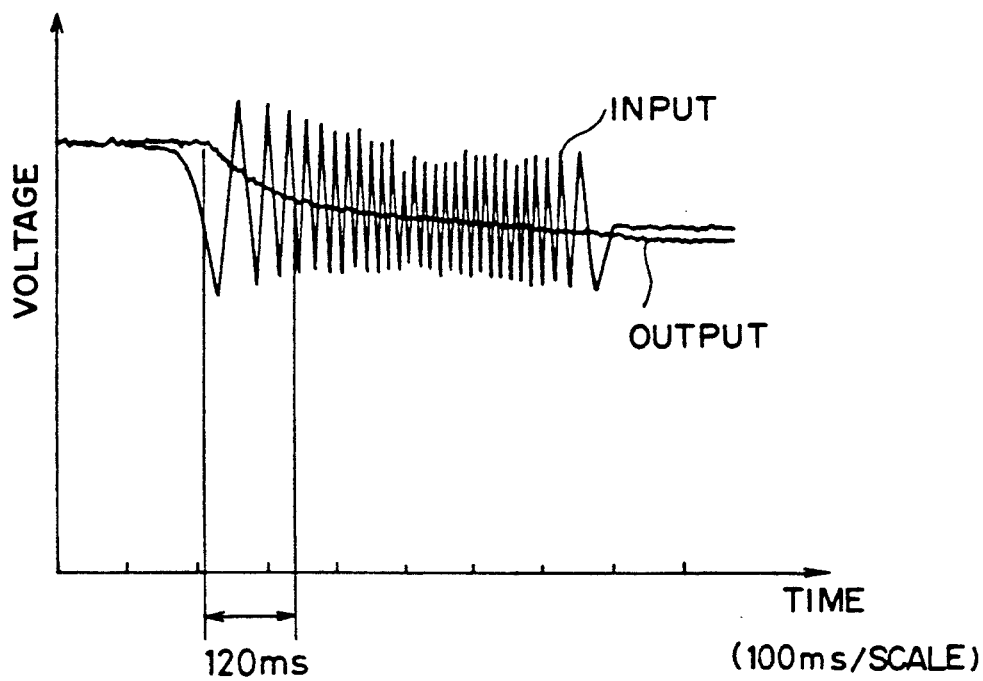
FIG. 5 is a diagram illustrative of the response characteristic of the mean value calculating circuit used in the third embodiment.
Figure 7:
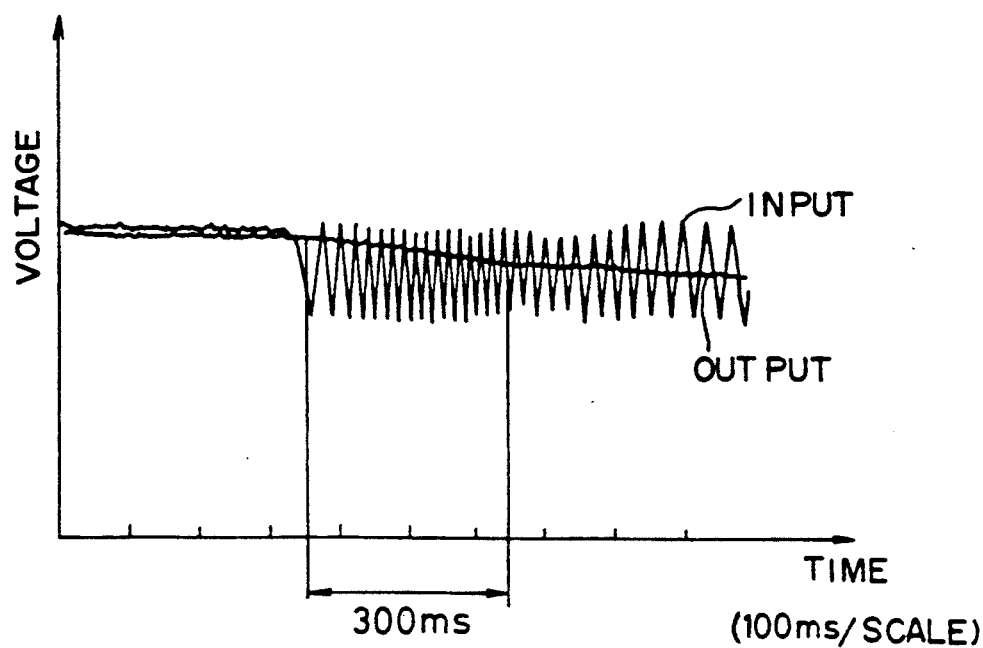
FIG. 7 is a diagram illustrative of the response characteristic of the mean value calculating circuit shown in FIG. 6.

The provision of such diodes $D_8$, $D_9$, $D_{10}$ and $D_{11}$ for charging the respective capacitors reduces the calculation time constant. For instance, the response time which is 300 ms in conventional apparatus can be shortened to 120 ms, as will be seen from FIG. 5.

As will be understood from the foregoing description, according to the present invention, the time required for charging each capacitor can be reduced because the charging is conducted through a diode. Consequently, the calculation time constant (smoothing time constant) of the mean value calculating circuit is made smaller to correspondingly reduce the delay of response. Furthermore, since the diode allows the electric current to pass therethrough only in the direction for charging the capacitor, the capacitor can maintain an ordinary time constant in the discharging direction, so that the smoothing characteristic of the mean value calculating circuit is not impaired.

In addition, according to the invention, the output voltage of the detecting circuit passes through a series of low-pass active filters which are arranged in such an order that the filter closer to the input end has a higher center frequency. Consequently, the attenuation in one of the stages of the filter is superposed on the attenuation produced by the filter of the preceding stage, so that the calculation time constant is reduced to correspondingly reduce the delay of calculation.

A further improvement in the characteristic of the apparatus is obtainable by providing diodes for charging the capacitors of the low-pass active filters.

Industrial Applicability

The present invention can effectively be applied to the detection of the position of a cylinder rod in a construction or industrial machine, the position of a piston of an automotive engine or the position of a scaler of a magnetic scale, and can operate with a reduced delay of response of filtering operation.

I claim:

1. A position detecting apparatus of the type having a bridge detecting circuit for detecting a magnetic characteristic of a rod, the magnetic characteristic of which is periodically varied in the direction of the longitudinal axis thereof, and for producing an output voltage corresponding to the thus detected magnetic characteristic, and a comparator circuit for comparing the output voltage of said bridge detecting circuit with a reference voltage and for producing, responsive to a comparison of the output voltage of said bridge detecting circuit with said reference voltage, a comparator circuit output voltage representative of the position of said rod, said position detecting apparatus comprising:

a mean value calculating circuit for calculating the mean value of the output voltage from said bridge detecting circuit and for delivering the thus calculated mean value to said comparator circuit as said reference voltage, wherein said mean value calculating circuit comprises a low-pass active filter, wherein said low-pass active filter comprises a plurality of resistors, a plurality of capacitors and a plurality of diodes, each of said diodes being connected in parallel with a respective one of said resistors for passing current only in the direction for enabling the charging of a respective one of said capacitors so as to shorten the time required for charging said respective one of said capacitors while maintaining an ordinary discharge time constant for said respective one of said capacitors.

2. A position detecting apparatus of the type having:

a detecting circuit for detecting a magnetic characteristic of a rod, the magnetic characteristic of said rod being periodically varied in the direction of the longitudinal axis of said rod, and for producing an output voltage corresponding to the thus detected magnetic characteristic, and a comparator circuit for comparing the output voltage of said detecting circuit with a reference voltage and for producing, responsive to a comparison of the output voltage of said detecting circuit with said reference voltage, a comparator circuit output voltage representative of the position of said rod, said position detecting apparatus further comprising:

a mean value calculating circuit for calculating the mean value of the output voltage from said detecting circuit and for delivering the thus calculated mean value to said comparator circuit as said reference voltage, said mean value calculating circuit having an input end and an output end and including a plurality of stages of low-pass active filters which have different values of center frequency and which are connected in series between said input end and said output end such that the center frequency of the low-pass active filter of each one of said plurality of stages is higher than that of the low-pass active filter of the next adjacent one of said plurality of stages which is further from the input end.

3. A position detecting apparatus according to claim 2, wherein said low-pass active filter of each stage has a capacitor, and a resistor and a diode connected in parallel with each other for charging the capacitor of the respective low-pass active filter.

4. A position detecting apparatus comprising:

a bridge detecting circuit for detecting a magnetic characteristic of an element where the magnetic characteristic varies along said element, and for producing an output voltage corresponding to the thus detected magnetic characteristic;

a comparator circuit for comparing the output voltage of said bridge detecting circuit with a reference voltage, thus determining the position of said element on the basis of an output signal from said comparator circuit;

a means value calculating circuit for calculating a mean value of the output voltage from said bridge detecting circuit and for delivering the calculated mean value to said comparator circuit as said reference voltage; and said mean value calculating circuit having at least one low-pass active filter, each of said at least one low-pass active filter having at least one resistor and at least one capacitor, with at least one of said at least one low-pass active filter having a diode connected in parallel with one of said at least one resistor of the respective low-pass active filter for charging one of said at least one capacitor of the respective low-pass active filter.

5. A position detecting apparatus according to claim 4, wherein said element is a rod having a longitudinal axis and wherein the magnetic characteristic varies along said longitudinal axis.

6. A position detecting apparatus according to claim 4, wherein each of said at least one low-pass active filter has an input terminal and an output terminal with first and second resistors connected in series between said input terminal and said output terminal, a first capacitor connected to said output terminal, a second capacitor connected to a point between said first and second resistors, a first diode connected in parallel with said first resistor, and a second diode connected in parallel with said second resistor, said first diode being connected so as to pass current only in the direction for charging said second capacitor, said second diode being connected so as to pass current only in the direction for charging said first capacitor.

7. A position detecting apparatus according to claim 6, wherein each said low-pass active filter further comprises an operational amplifier having first and second inputs and an output connected to said second input, with said output terminal being connected to said first input of said operational amplifier, and with said second capacitor being connected between said second input of said operational amplifier and said point between said first and second resistors.

8. A position detecting apparatus according to claim 7, wherein said mean value calculating circuit includes a plurality of low-pass active filters connected as stages in series between an input end and an output end, said plurality of low-pass active filters having different values of center frequency with the center frequency of each low-pass active filter closer to the input end being higher than that of the adjacent low-pass active filter which is closer to the output end.

9. A position detecting apparatus according to claim 4, wherein said mean value calculating circuit includes a plurality of low-pass active filters connected as stages in series between an input end and an output end, and wherein each said low-pass active filter has a diode connected in parallel with a resistor of the respective low-pass active filter for charging a capacitor of the respective low-pass active filter.

10. A position detecting apparatus according to claim 9, wherein each said low-pass active filter has an input terminal and an output terminal with first and second resistors connected in series between said input terminal and said output terminal, a first capacitor connected to said output terminal, a second capacitor connected to a point between said first and second resistors, a first diode connected in parallel with said first resistor, a second diode connected in parallel with said second resistor, said first and second diodes being connected for conduction of current in opposite directions.

11. A position detecting apparatus according to claim 9, wherein said plurality of low-pass active filters have different values of center frequency with the center frequency of each low-pass active filter closer to the input end being higher than that of the adjacent low-pass active filter which is closer to the output end.

12. A position detecting apparatus according to claim 11, wherein said element is a rod having a longitudinal axis and wherein the magnetic characteristic varies along said longitudinal axis.

13. A position detecting apparatus according to claim 4, wherein said mean value calculating circuit includes a plurality of low-pass active filters connected as stages in series between an input end and an output end, said plurality of low-pass active filters having different values of center frequency with the center frequency of each low-pass active filter closer to the input end being higher than that of the adjacent low-pass active filter which is closer to the output end.

14. A position detecting apparatus according to claim 13, wherein said element is a rod having a longitudinal axis and wherein the magnetic characteristic varies along said longitudinal axis.

15. A position detecting apparatus according to claim 13, wherein each said low-pass active filter has an input terminal and an output terminal with first and second resistors connected in series between said input terminal and said output terminal, a first capacitor connected to said output terminal, and a second capacitor connected to a point between said first and second resistors.

16. A position detecting apparatus according to claim 15, wherein each said low-pass active filter further comprises an operational amplifier having first and second inputs and an output connected to said second input, with said output terminal being connected to said first input of said operational amplifier, and with said second capacitor being connected between said second input of said operational amplifier and said point between said first and second resistors.

17. A position detecting apparatus according to claim 13, wherein each said low-pass active filter has a diode connected in parallel with a resistor of the respective low-pass active filter for charging a capacitor of the respective low-pass active filter.

18. A position detecting apparatus according to claim 17, wherein said element is a rod having a longitudinal axis and wherein the magnetic characteristic varies along said longitudinal axis.

* * * * *

UNITED STATES PATENT AND TRADEMARK OFFICE
CERTIFICATE OF CORRECTION

PATENT NO. : 5,327,078
DATED : July 5, 1994
INVENTOR(S) : Akira MORI

It is certified that error appears in the above-indentified patent and that said Letters Patent is hereby corrected as shown below:

Title page, Item [54], delete "APPARSTUS" and insert --APPARATUS--.

Title page, Item [73], delete "Speisakusho" and insert --Seisakusho--.

Column 8, line 67, delete "means" and --mean--.

Signed and Sealed this

Twenty-seventh Day of September, 1994

Attest:

BRUCE LEHMAN

*Attesting Officer*     *Commissioner of Patents and Trademarks*